US008599711B2

(12) United States Patent
Hugl et al.

(10) Patent No.: US 8,599,711 B2
(45) Date of Patent: Dec. 3, 2013

(54) REFERENCE SIGNAL PORT DISCOVERY INVOLVING TRANSMISSION POINTS

(75) Inventors: Klaus Hugl, Helsinki (FI); Cassio Barboza Ribeiro, Espoo (FI); Timo Lunttila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 221 days.

(21) Appl. No.: 13/066,227

(22) Filed: Apr. 8, 2011

(65) Prior Publication Data
US 2012/0257515 A1    Oct. 11, 2012

(51) Int. Cl.
*G01R 31/08*    (2006.01)

(52) U.S. Cl.
USPC ........... 370/252; 370/329; 370/330; 370/336; 455/452.1

(58) Field of Classification Search
USPC ............... 370/252, 329, 330, 336; 455/452.1
See application file for complete search history.

(56) References Cited

U.S. PATENT DOCUMENTS

| 6,438,113 | B1 * | 8/2002 | Yang et al. | 370/329 |
|---|---|---|---|---|
| 6,438,119 | B1 * | 8/2002 | Kim et al. | 370/335 |
| 6,882,632 | B1 * | 4/2005 | Koo et al. | 370/335 |
| 7,106,791 | B2 * | 9/2006 | Chen et al. | 375/224 |
| 7,444,169 | B2 * | 10/2008 | Ishii et al. | 455/561 |
| 7,551,589 | B2 * | 6/2009 | Kim et al. | 370/335 |
| 7,917,166 | B2 * | 3/2011 | Cho et al. | 455/522 |
| 8,023,988 | B2 * | 9/2011 | Shiu et al. | 455/522 |
| 8,169,957 | B2 * | 5/2012 | Damnjanovic | 370/329 |
| 8,208,434 | B2 * | 6/2012 | Sayana et al. | 370/329 |
| 8,254,295 | B2 * | 8/2012 | Choi et al. | 370/280 |
| 8,274,951 | B2 * | 9/2012 | Liu et al. | 370/332 |
| 8,311,053 | B2 * | 11/2012 | Choi | 370/442 |
| 2004/0142698 | A1 * | 7/2004 | Pietraski | 455/452.2 |
| 2008/0186892 | A1 * | 8/2008 | Damnjanovic | 370/311 |
| 2009/0022235 | A1 * | 1/2009 | Zhang et al. | 375/260 |
| 2009/0122736 | A1 * | 5/2009 | Damnjanovic et al. | 370/311 |
| 2009/0305714 | A1 * | 12/2009 | Tanigawa et al. | 455/450 |
| 2010/0159921 | A1 * | 6/2010 | Choi et al. | 455/425 |
| 2010/0202308 | A1 * | 8/2010 | Gorokhov et al. | 370/252 |
| 2010/0227569 | A1 * | 9/2010 | Bala et al. | 455/73 |
| 2010/0238821 | A1 * | 9/2010 | Liu et al. | 370/252 |

(Continued)

OTHER PUBLICATIONS

3GPP TSG RAN WG1 Meeting #64, R1-110720, Taipel Feb. 21-25, 2011, CATT, "Further Considerations on Scenario 3 & 4", (3 pages).

(Continued)

*Primary Examiner* — Andrew Lai
*Assistant Examiner* — Andrew C Lee
(74) *Attorney, Agent, or Firm* — Harrington & Smith (57) ABSTRACT

A method includes receiving information indicating one or more sets of reference signal patterns from a first transmission point, wherein at least one of the indicated one or more sets of reference signal patterns corresponds to one of one or more other transmission points; measuring the channel quality for the indicated sets of reference signal patterns; and reporting indications of the measured channel quality for the indicated one or more sets of reference signal patterns to the first transmission point. Another method includes transmitting information indicating one or more sets of reference signal patterns from a first transmission point to a user equipment, wherein at least one of the indicated one or more sets of reference signal patterns corresponds to one of one or more other transmission points; and receiving from the user equipment indications of measured channel quality for the indicated one or more sets of reference signal patterns.

20 Claims, 11 Drawing Sheets

(56) References Cited

U.S. PATENT DOCUMENTS

| | | | |
|---|---|---|---|
| 2010/0246527 A1* | 9/2010 | Montojo et al. | 370/330 |
| 2010/0254329 A1* | 10/2010 | Pan et al. | 370/329 |
| 2011/0032838 A1* | 2/2011 | Liu et al. | 370/252 |
| 2011/0085457 A1* | 4/2011 | Chen et al. | 370/252 |
| 2011/0103295 A1* | 5/2011 | Khandekar et al. | 370/315 |
| 2011/0111781 A1* | 5/2011 | Chen et al. | 455/507 |
| 2011/0216682 A1* | 9/2011 | Xu et al. | 370/311 |
| 2011/0294527 A1* | 12/2011 | Brueck et al. | 455/466 |
| 2012/0044882 A1* | 2/2012 | Kim et al. | 370/329 |
| 2012/0058791 A1* | 3/2012 | Bhattad et al. | 455/509 |
| 2012/0120891 A1* | 5/2012 | Mazzarese et al. | 370/329 |

OTHER PUBLICATIONS

3GPP TSG RAN WG1 Meeting #64, R1-111000, Taipel Feb. 21-25, 2011, ETRI, "Discussion on Further Details of Scenario 4", (3 pages).

3GPP TSG RAN WG1 Meeting #63bis R1-110172, Dublin, Ireland, Jan. 17-21, 2011, ZTE, "Views on Rel-11 CoMP", (3 pages).

3GPP TSG RAN WG1 Meeting #64, R1-110629, Taipel, Feb. 21-25, 2011, Huawei, HiSilicon, "Further Details of Scenarios", (4 pages).

3GPP TSG RAN WG1 Meeting #64, R1-110744, Taipel, Taiwan, Feb. 21-Feb. 25, 2010, Samsung, "Discussion on Intra-cell CoMP Operation", (4 pages).

3GPP TSG RAN WG1 #64, Ri1-110802, Taipel, Feb. 21-25, 2011, "Further Details of CoMP Scenarios for Evaluation, Especially Scenario 4", Alcatel-Lucent, Alcatel-Lucent Shanghai Bell, (8 pages).

3GPP TSG RAN WG1 #64, R1-110649, Taipel, Taiwan, Feb. 21-Feb. 25, 2011, Ericsson, St-Ericsson, "Aspects on Distributed RRUs With Shared Cell-ID for Heterogeneous Deployments", (11 pages).

"Baseline Schemes and Focus of CoMP Studies", Ericsson, 3GPP TSG-RAN WG1 #63bis, R1-110461, Jan. 2011, 2 pgs.

"CoMP simulation assumptions", NTT Docomo, TSG-RAN WG1 #63bis, R1-110603, Jan. 2011, 4 pgs.

"Revised SID Proposal: Coordinated Multi-Point Operation for LTE", Samsung, 3GPP TSG RAN #50, RP-101425, Dec. 2010, 6 pgs.

"$3^{rd}$ Generation Partnership Project; Technical Specification Group Radio Access Network; Evolved Universal Terrestrial Radio Access (E-UTRA); Physical channels and modulation (Release 10)", 3GPP TS 36.211 V10.0.0, Dec. 2010, 103 pgs.

* cited by examiner

REFERENCE SIGNAL PORT DISCOVERY INVOLVING TRANSMISSION POINTS

TECHNICAL FIELD

This invention relates generally to radio frequency communications and, more specifically, relates to mobility of a wireless device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
COMP coordinated multipoint
CSI channel state information
CSI-RS channel state information-reference signals
CQI channel quality indicator
DL downlink (from base station to user equipment)
DM-RS demodulation reference symbols
eNB E-UTRAN Node B (evolved Node B, also eNodeB)
E-UTRAN evolved UTRAN (LTE)
LTE long term evolution of UTRAN (E-UTRAN)
LTE-A LTE advanced
MCS modulation and coding scheme
MIMO multiple input multiple output
MME mobility management entity
NCE network control element
PDSCH physical downlink shared channel
PMI precoding matrix indicator
PUCCH physical uplink control channel
PUSCH physical uplink shared channel
OFDM orthogonal frequency division multiplexing
OFDMA orthogonal frequency division multiple access
Rel. release
TM transmission mode
TS technical standard
RAT radio access technology
RRH remote radio head
RS reference signal/symbol
RSRP reference symbol received power
RSRP reference symbol received quality
SC-FDMA single carrier, frequency division multiple access
SGW serving gateway
SRS sounding reference symbols
UE user equipment, such as a mobile station, mobile node or mobile terminal
UL uplink (from user equipment to base station)
UTRAN universal terrestrial radio access network
WCDMA wideband code division multiple access COordinated MultiPoint (COMP) transmission and reception is one of the investigated technologies in 3GPP LTE-A to enhance specifically the cell-edge data rates in order to create a more uniform data rate experience for the end user over the entire cell area. The COMP techniques involve increased collaboration between different transmission/reception points (e.g., eNodeBs, RRHs, hotspots, home eNodeBs etc.) in DL transmissions to the UE and UL receptions from the UE.

Already in Rel. 10, there has been a related study item in 3GPP, but the study item had been put on hold. The study item was recently restarted in 3GPP in January 2011 according to the study item description. Moreover, different scenarios to be investigated have been agreed to in 3GPP for the study item phase. One of the agreed scenarios (RAN1#63bis meeting, Dublin, January 2011) concentrates on a network with low power RRHs within the macro cell coverage where the transmission/reception points created by the RRHs have the same cell IDs as the macro cell. This situation is denoted therein as "single-cell COMP".

BRIEF SUMMARY

An exemplary method includes receiving information indicating one or more sets of reference signal patterns from a first transmission point, wherein at least one of the indicated one or more sets of reference signal patterns corresponds to one of one or more other transmission points; measuring the channel quality for the indicated one or more sets of reference signal patterns; and reporting indications of the measured channel quality for the indicated one or more sets of reference signal patterns to the first transmission point.

An exemplary apparatus includes one or more processors and one or more memories including computer program code. The one or more memories and the computer program code are configured to, with the one or more processors, cause the apparatus to perform at least the following: receiving information indicating one or more sets of reference signal patterns from a first transmission point, wherein at least one of the indicated one or more sets of reference signal patterns corresponds to one of one or more other transmission points; measuring the channel quality for the indicated one or more sets of reference signal patterns; and reporting indications of the measured channel quality for the indicated one or more sets of reference signal patterns to the first transmission point In an additional exemplary embodiment, a computer program product includes a computer-readable memory bearing computer program code embodied therein for use with a computer. The computer program code includes: code for receiving information indicating one or more sets of reference signal patterns from a first transmission point, wherein at least one of the indicated one or more sets of reference signal patterns corresponds to one of one or more other transmission points; code for measuring the channel quality for the indicated one or more sets of reference signal patterns; and code for reporting indications of the measured channel quality for the indicated one or more sets of reference signal patterns to the first transmission point.

Another exemplary method includes transmitting information indicating one or more sets of reference signal patterns from a first transmission point to a user equipment, wherein at least one of the indicated one or more sets of reference signal patterns corresponds to one of one or more other transmission points; and receiving from the user equipment indications of measured channel quality for the indicated one or more sets of reference signal patterns.

A further exemplary embodiment includes an apparatus that includes one or more processors one or more memories including computer program code. The one or more memories and the computer program code are configured to, with the one or more processors, cause the apparatus to perform at least the following: transmitting information indicating one or more sets of reference signal patterns from a first transmission point to a user equipment, wherein at least one of the indicated one or more sets of reference signal patterns corresponds to one of one or more other transmission points; and receiving from the user equipment indications of measured channel quality for the indicated one or more sets of reference signal patterns.

In an additional exemplary embodiment, a computer program product includes a computer-readable memory bearing computer program code embodied therein for use with a computer. The computer program code includes code for transmitting information indicating one or more sets of reference signal patterns from a first transmission point to a user equipment, wherein at least one of the indicated one or more sets of reference signal patterns corresponds to one of one or more other transmission points; and code for receiving from the user equipment indications of measured channel quality for the indicated one or more sets of reference signal patterns.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF THE DRAWINGS

Figure 1:
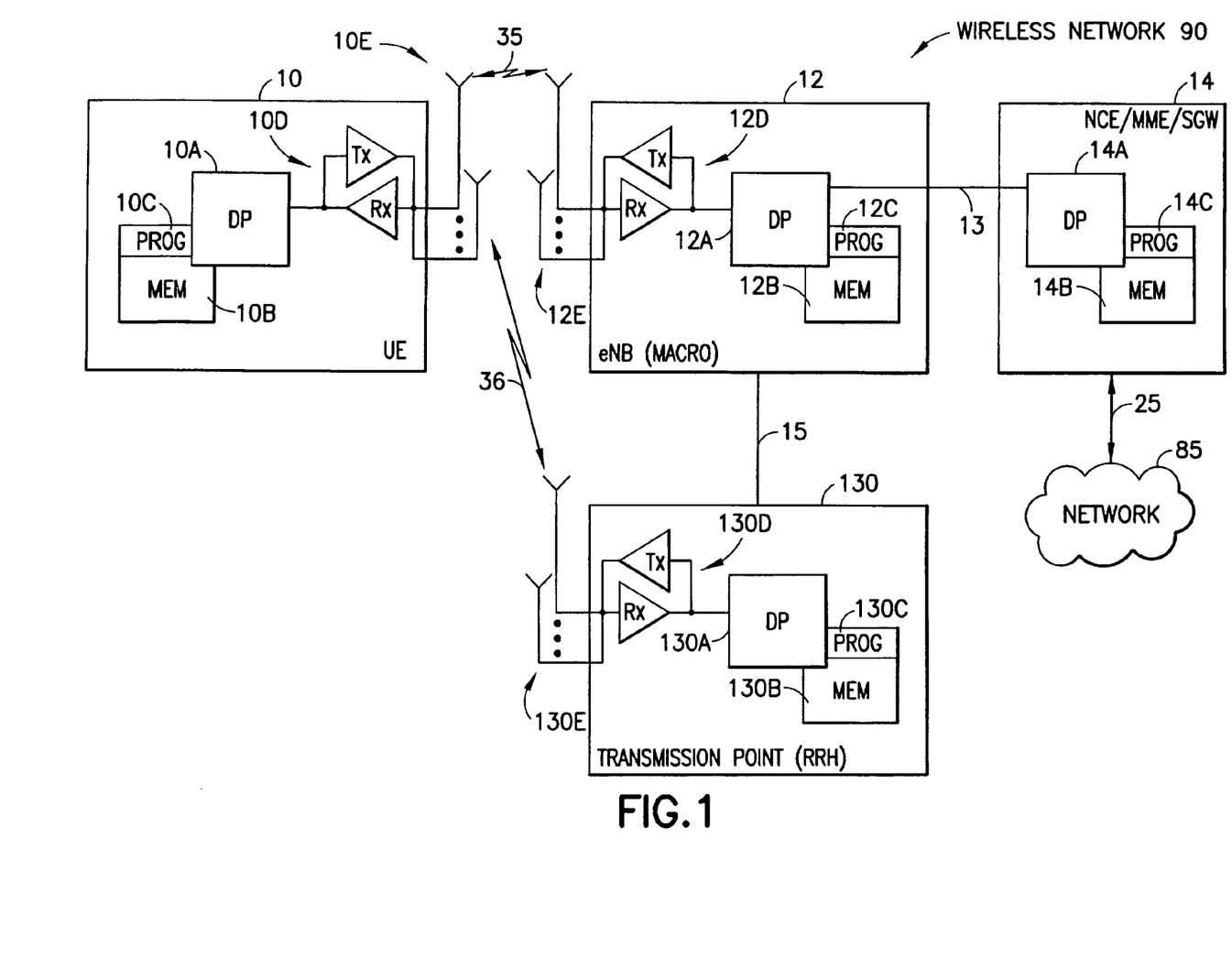
FIG. 1 shows a simplified block diagram of various electronic devices that are suitable for use in practicing the exemplary embodiments of this invention.

Before describing in further detail the exemplary embodiments of this invention, reference is made to FIG. 1 for illustrating a simplified block diagram of various apparatus that are suitable for use in practicing the exemplary embodiments of this invention. In FIG. 1, a wireless network 90 includes an eNB 12, an NCE/MME/SGW 14, and a transmission point such as RRH 130. The wireless network 90 is adapted for communication over a wireless link 35 with an apparatus, such as a mobile communication device which may be referred to as a UE 10, via a network access node, such as a Node B (base station), and more specifically an eNB 12. The network 90 may include a network control element (NCE) 14 that may include MME/SGW functionality, and which provides connectivity with a further network, such as a telephone network and/or a data communications network 85 (e.g., the internet) through link 25. The NCE 14 includes a controller, such as at least one computer or a data processor (DP) 14A, and at least one non-transitory computer-readable memory medium embodied as a memory (MEM) 14B that stores a program of computer instructions (PROG) 14C.

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas 10E. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 12E (typically several when multiple input, multiple output (MIMO) operation is in use). The eNB 12 is coupled via a data and control path 13 to the NCE 14. The path 13 may be implemented as an S1 interface. The eNB 12 may also be coupled to another transmission point via data and control path 15, which may be implemented as an X2 interface in case of another logical base station or can be a direct eNodeB internal interface, e.g., optical fiber connection, to connect some transmission point such as radio remote head (RRH) 130 to the eNB 12. Typically, the eNB 12 covers a single macro cell (shown in FIG. 4) via the one or more antennas 12E.

Figure 4:
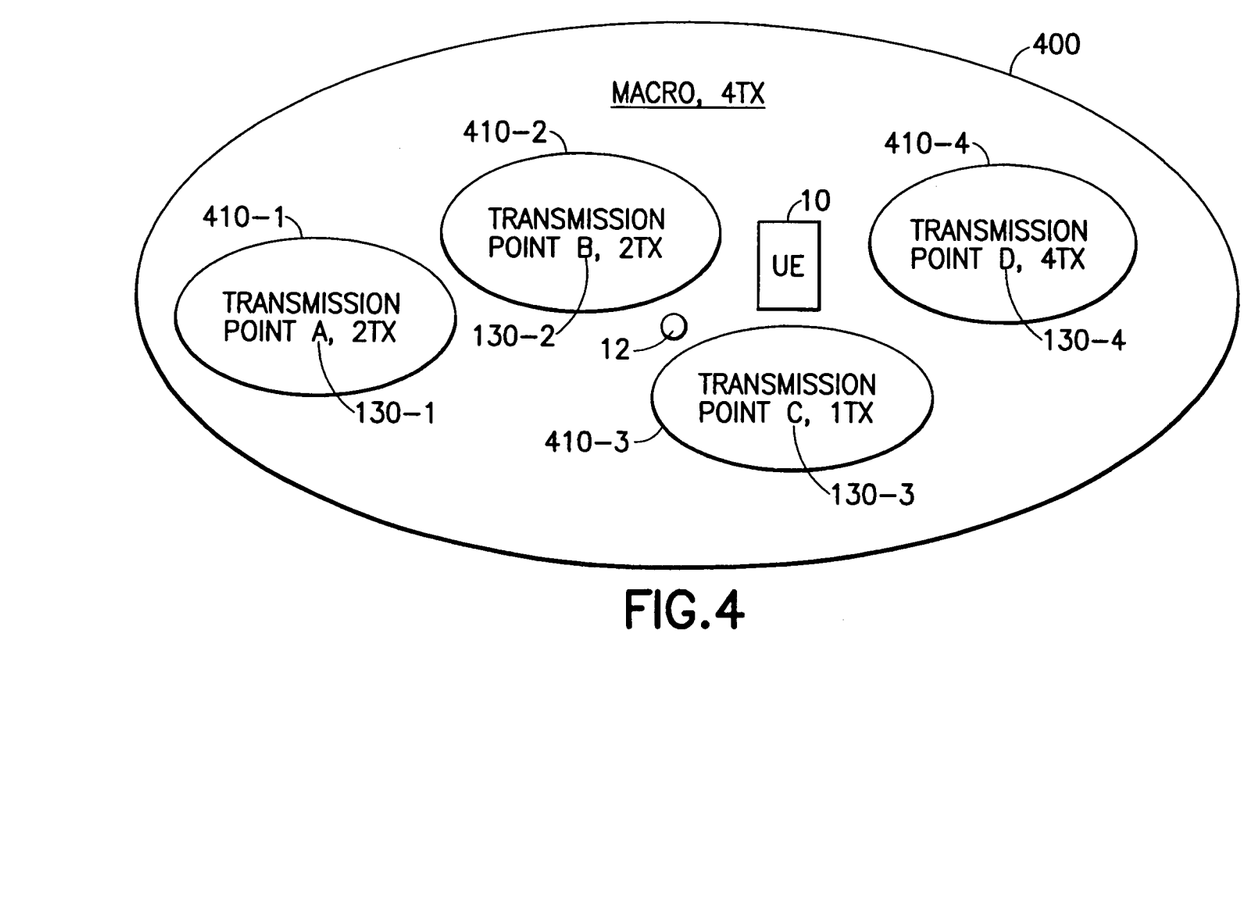
FIG. 4 is an example of a macro cell having multiple transmission points within the macro cell.

In this example, the transmission point 130 includes a controller, such as at least one computer or a data processor (DP) 130A, at least one computer-readable memory medium embodied as a memory (MEM) 130B that stores a program of computer instructions (PROG) 130C, and at least one suitable RF transceiver 130D for communication with the UE 10 via one or more antennas 130E (as stated above, typically several when multiple input, multiple output (MIMO) operation is in use). The transmission point 130 communicates with the UE 10 via a link 36. The transmission point 130 may communicate, depending on implementation, with the eNB 12 using a data and control path 15. The transmission point 130 can be another eNodeB or can be logically be part of eNB 12 as, e.g., enabled by a Radio Remote Head (RRH) and creates some local hotspot coverage 410 inside the macro cell coverage area (as shown in FIG. 4). For single-cell MIMO—all of the transmission points 130 (see also FIG. 4) are under full control of a single eNB 12. Thus, there is centrally some unit where several transmission points/RRHs 130 are connected as such. The idea is that the transmission points 130 and the macro eNB 12 are centrally controlled together. The control is typically at the location of the macro eNB 12, but could also be at a location that is connected to the eNB 12 and the transmission point 130.

At least one of the PROGs 10C, 12C, and 130C is assumed to include program instructions that, when executed by the associated DP, enable the corresponding apparatus to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, and/or by the DP 130A of the base station 120, or by hardware (e.g., an integrated circuit configured to perform one or more of the operations described herein), or by a combination of software and hardware (and firmware).

In general, the various embodiments of the UE 10 can include, but are not limited to, cellular telephones, tablets having wireless capability, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B, and 130B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, and 130A may be of any type suitable to the local technical environment, and may include one or more of general purpose computers, special purpose computers, microprocessors, digital signal processors (DSPs) and processors based on multi-core processor architectures, as non-limiting examples.

Figure 2:
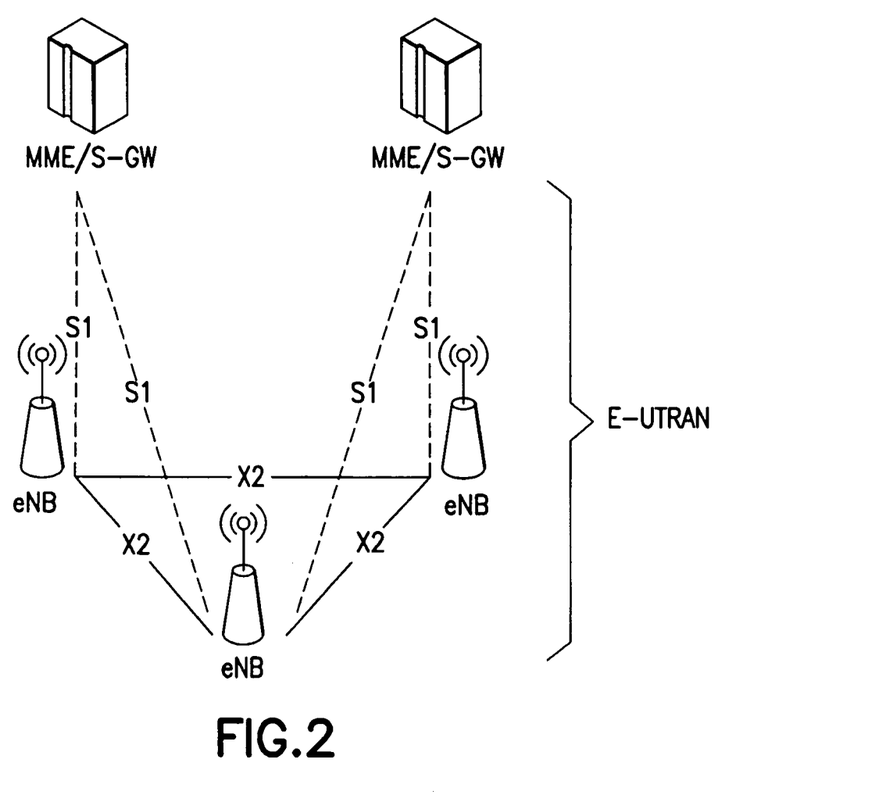
FIG. 2 reproduces FIG. 4 of 3GPP TS 36.300 and shows the overall architecture of the EUTRAN system, and illustrates an exemplary embodiment where the base station of FIG. 1 is embodied as an eNB in an LTE or an LTE-A type of wireless communication system.

In one non-limiting embodiment, the BS 12 can be embodied as an eNB if the wireless network 1 is a long term evolution (LTE) or an LTE-Advanced (LTE-A) E-UTRAN type of network. FIG. 2 shows the overall architecture of the E-UTRAN system. The network 90 includes a core network that includes at least one serving gateway (SG-W in FIG. 2 and SGW in FIG. 1) and can include at least one a mobility management entity (MME), here collectively shown as the MME/S-GW. In this system, the DL access technique is OFDMA, and the UL access technique is SC-FDMA.

Now that exemplary apparatus have been described, additional detail on the exemplary embodiments of the invention is described. Exemplary embodiments of the instant invention relate to DL COMP operation in general, but specifically also to the envisioned single-cell operation mode ("single-cell COMP") of coordinated multipoint reception and transmission, which was described above.

Figure 3:
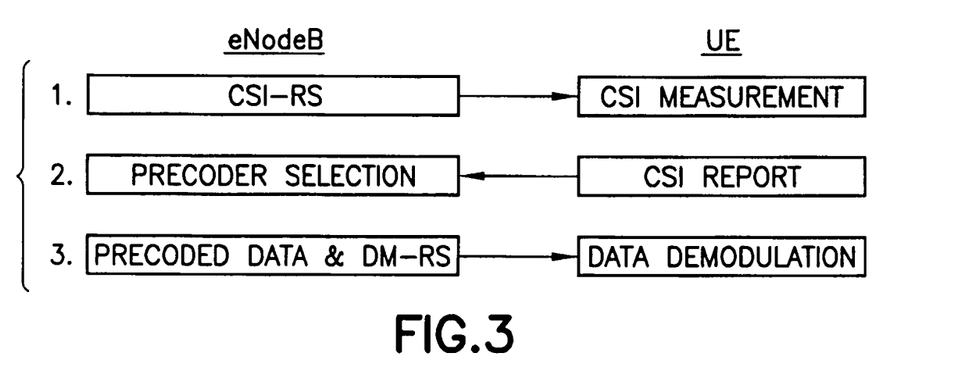
FIG. 3 is a diagram illustrating a procedure of data transmission using CSI-RS.

In LTE Release-10, one of the main new features is the introduction of CSI-RS (channel state information-reference signals). The idea is to transmit separate cell specific (common) RS for CSI estimation purposes in some selected subframes with, e.g., 10 ms (millisecond) periodicity. Turning to FIG. 3, a diagram is shown that illustrates a procedure of data transmission using CSI-RS. The UE estimates the CSI ("CSI measurement") based upon the CSI-RS transmitted by the eNodeB and transmits the CSI feedback ("CSI report") to the eNodeB, which in turn can use the CSI in the selection of the precoder for the data. In reference 3, the data is transmitted together with user specific (i.e., dedicated) demodulation reference symbols (DM-RS), spanning the same physical resource blocks as the data. The same precoding is applied for the DM-RS and the data. This allows for the usage of any precoding by the eNodeB, as the precoding applied remains transparent to the user equipment and does not need to be signaled to the user equipment.

In addition to the CSI-RS transmission for one cell (e.g., a macro cell), the LTE Rel-10 also provides a possibility to configure other CSI-RS patterns (e.g., sets of resource elements) with zero transmit power. This is described below in more detail in reference to FIG. 7. These patterns are signaled to user equipment via muting patterns, and these indicate which of the resource elements the eNodeB will leave empty when transmitting data on PDSCH. This allows for a potentially future proof CSI-RS design, so that a Rel. 11 UE can, e.g., measure CSI-RS from multiple cells simultaneously without PDSCH interference (a feature not yet included into LTE Rel-10).

One example of a network deployment scenario of interest in this case is depicted in FIG. 4. Within the coverage area 400 of one macro eNodeB 12 with, e.g., 4 TX antennas 12E, there are altogether four hotspots 410-1 through 410-4 created by four transmission points 130-1 through 130-4, each having some (1, 2, 4 or 8) transmit antennas 130E and a respective number (1, 2, 4 or 8) of CSI-RS antenna ports.

The transmission points 130 may or may not have the same cell ID (identity) as the macro transmission point 12:

In the conventional heterogeneous networks scenario, the transmission points 130 are cells of their own, each having a distinct cell ID.

In case of single-cell COMP, several transmission points/nodes such as the transmission points 130 implemented, e.g., through Remote Radio Heads (RRHs) as well as the macro eNodeB 12, possibly having different transmission powers, share the same physical cell-ID and are only to be distinguished by the UE by different CSI-RS.

In both of the above mentioned scenarios, constantly monitoring and reporting the channel state information (CSI) for all the CSI-RS antenna ports configured for all transmission points/nodes would dramatically increase the measurement overhead and reporting overhead for the UE and therefore, from a network point of view, the UL control channel overhead. It is therefore of advantage that the UE would only regularly report the CSI for the macro eNodeB 12 and the transmission points 130 which, e.g., are closest to the user equipment or have best signal quality, and utilize only this subset of transmission points in the CSI reporting and related DL COMP operations (which is called in the 3GPP community the "DL COMP collaboration set") for the user equipment.

One exemplary problem therefore is how the eNodeB/network and the UE determine which of the transmission points (eNB 12 and transmission points 130) out of a set of configured CSI-RS antenna ports should be included in the regular CSI and channel quality (CQI) reporting and the DL COMP operations. An issue to be solved, consequently, is how the network/eNodeBs and the UE "know" and define the CSI-RS antenna ports the UE is supposed to regularly monitor, create CSI measurements based on, and report back to the network.

The instant invention proposes a solution to this problem, based in an exemplary embodiment on the available CSI-RS antenna port information at the UE. An exemplary embodiment utilizes the "zero power CSI-RS bitmap", also called the CSI-RS muting pattern in this disclosure, as well as the UE-specific configured reference signal ports at the UE. Regarding the zero power CSI-RS pattern, see section 6.10.5 in 3GPP TS 36.211, draft a00 for version 10.0.0, December 2010. The CSI-RS muting pattern may indicate the CSI-RS patterns that are configured within the area of interest (multiple transmission points (RRHs) 130 with the same cell ID and/or a few neighboring cells; see FIG. 4). This muting pattern includes 16 bits, so that the user equipment knows what modulation symbols in addition to the configured UE-specific CSI-RS ports have to be rate-matched from the PDSCH in the PDSCH decoding process when utilizing 3GPP LTE DL transmission mode 9 (TM9), which is based on the utilization of CSI-RS for channel state information and DM-RS for decoding the received data. Each of the bits in the muting pattern indicates four resource elements for up to four CSI-RS antenna ports configured within the area.

It is helpful at this point to provide a simple example. Assume (as shown in FIG. 4) there is one macro cell 400 and four hotspots 410-1 to 410-4, created by corresponding transmission points A 130-1 to D 130-4. Assume the UE is connected to the macro cell 400/eNB 12 and is configured initially to use the CSI-RS antenna ports of the macro cell (see CSI-RS configuration number (#) 5 in FIGS. 5 and 6) and each transmission point 130 is assigned one CSI-RS configuration, resulting in a corresponding muting pattern for the UE. In the example shown in FIGS. 5 and 6, CSI-RS antenna ports of transmission point (T.P.) A 130-1 result in an entry in number two of the muting pattern, transmission point B 130-2 in number three, transmission point C 130-3 in number 7, and transmission point D 130-4 in number 9 of FIG. 5. Although not shown in FIGS. 5 and 6, the respective configurations may also include possible muting pattern entries of neighboring cells/eNodeBs that are signaled to the UE 10 of interest using the CSI-RS muting pattern 510 (shown in FIGS. 5 and 6).

Figure 5:
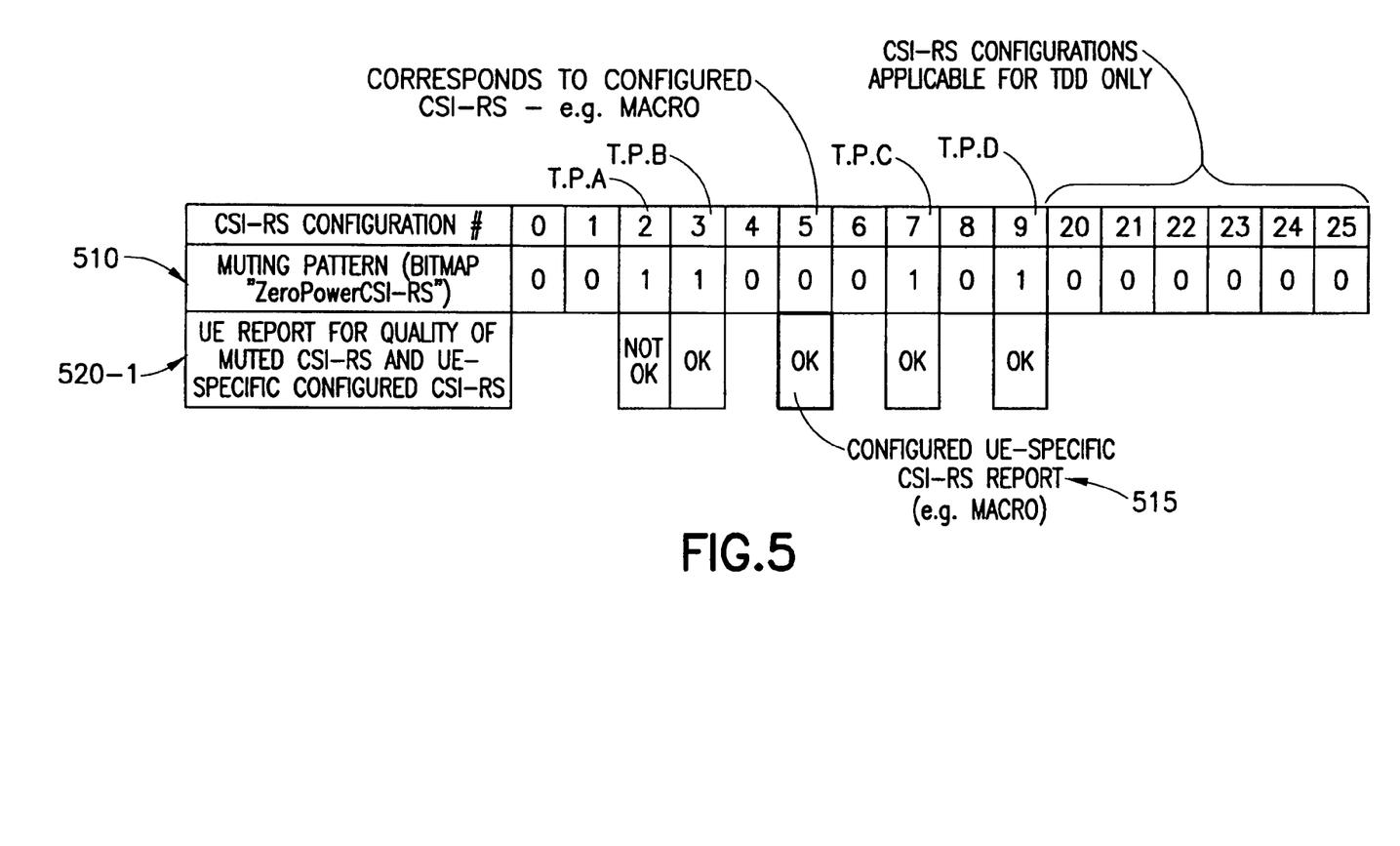
FIG. 5 is an example of a CSI-RS muting pattern combined with the UE-specifically configured CSI-RS ports and the channel and signal quality measured and reported by a user equipment.
Figure 6:
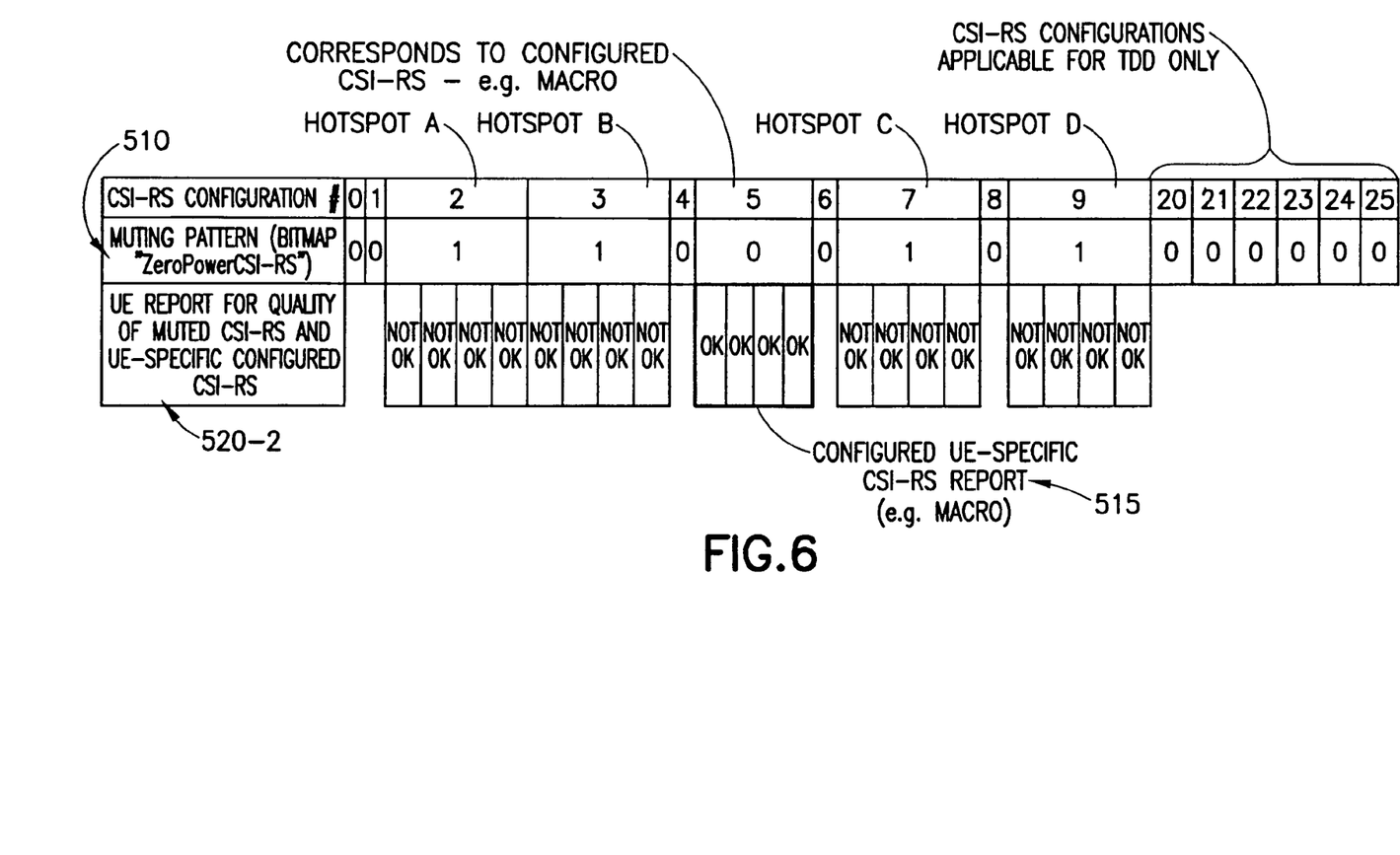
FIG. 6 is an example of a CSI-RS muting pattern combined with the UE-specifically configured CSI-RS ports and the channel and signal quality measured and reported by a user equipment.

An exemplary technique is to utilize the information contained in the CSI-RS muting pattern 510 about the possible number of configured CSI-RS antenna ports available for DL COMP cooperation and their position in the time-frequency domain within the PDSCH area of the LTE DL subframe (see FIG. 7) and request the UE to measure the channel quality (e.g., signal-strength) of all the CSI-RS antenna port groups indicated by the CSI-RS muting pattern 510 in addition to the for the UE configured CSI-RS patterns. For instance, in the present example, the UE is able to detect the CSI-RS from the transmission points B 130-2, C 130-3, and D 130-4, as indicated in FIGS. 5 and 6 and also the CSI-RS configured for the UE 10 (e.g., from the macro cell 400, as indicated by the configured UE-specific CSI-RS report 515). It is noted that zeros may be used instead of ones to indicate which CSI-RS antenna ports are active.

Figure 7:
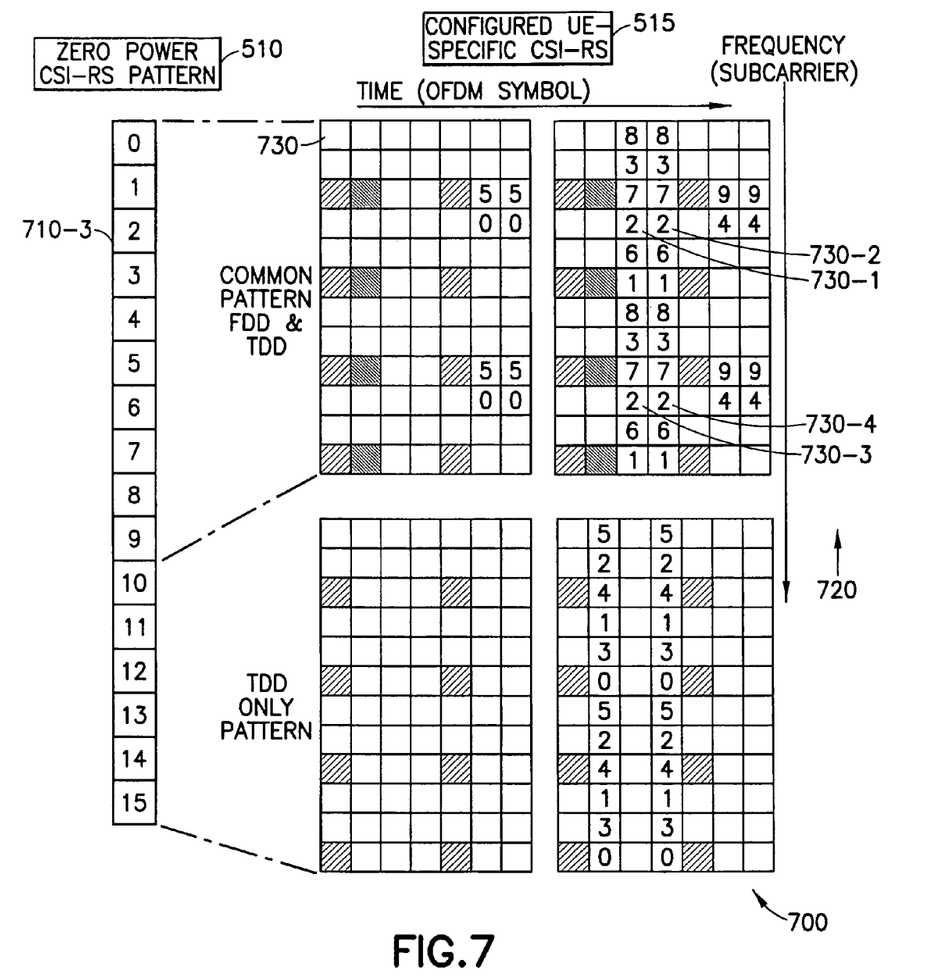
FIG. 7 shows an example of how the CSI-RS muting pattern is mapped to corresponding resource elements in a resource space.

It is noted that FIG. 7 shows an example of how the CSI-RS muting pattern 510 is mapped to a zero power CSI-RS configuration (indicated by numbered resource elements) in the resource space 700. The resource space 700 in this example is a PDSCH area of an LTE DL subframe. Each bit 710 in the CSI-RS muting pattern 510 corresponds to a set 720 of four resource elements 730-1, 730-2, 730-3, 730-4 in the resource space 700. A resource element 730 is an OFDM symbol occurring at a particular time and on a particular subcarrier. See, e.g., 3GPP TS 36.211 version 10.0.0 (December 2010), Chapter 6 and in particular 6.2.2 for a description of the PDSCH area of an LTE DL subframe. The main purpose of the zero power CSI-RS configuration is to avoid CSI-RS interference between neighbor cells. The zero power CSI-RS configuration also provides accurate inter-cell CSI measurement and guarantees future CoMP performance. The zero power CSI-RS configuration is independent from that of CSI-RS with its own duty-cycle and offset. Muting is always full-band configured for all PRBs (physical resource blocks). The 16 bits 710 are used to indicate Which resource elements should be muted, and cover both common and TDD only patterns. Each bit corresponds to, e.g., four resource elements following a 4Tx antenna port CSI-RS pattern. That is, the CSI-RS configuration for a cell or a transmission point (macro or hotspot) can require 2, 4, or 8 REs, depending on the number of antennas. For four antennas, four REs are needed. Since every bit in the muting pattern corresponds to four REs, this was designed such that these four REs correspond to a possible configuration of 4Tx CSI-RS in a neighboring cell or a transmission point belonging to the same logical cell. If two bits are "on" in the muting pattern, these can match two different 4Tx CSI-RS configurations (in neighboring cells or transmission points) or they can match one 8Tx CSI-RS configuration in a neighboring cell/transmission point. In the example shown in FIG. 7, bit 710-3 corresponds to a set 720 having resource elements 730-1, 730-2, 730-3, and 730-4 in the positions shown. It is noted that a set 720 may contain other numbers of resource elements.

That is, the UE 10 in FIG. 4 determines, using the CSR-RS muting pattern 510 as well as the UE-specific configured CSI-RS ports 515, which set 720 of resource elements 730 should be used to measure channel quality from other transmission points. Transmission point A 130-1 is configured to transmit its CSI reference signals on two reference symbols within the four resource elements 730-1 through 730-4. The other transmission points B 103-2, C 130-3, and D 130-4 are also similarly configured to transmit CSI reference signals at their respective sets 720 of resource elements 730, as indicated in FIG. 7. The UE 10 performs channel quality measurements of these sets 720 of resource elements including also for the UE configured CSI-RS antenna ports 515 (e.g., from the macro cell 400).

The report 520 is then sent by the UE 10 to the eNodeB. The granularity of the report 520-1 may be the same as in the muting bitmap, i.e., groups of four CSI-RS antenna ports as shown in FIG. 5. Alternatively, the report 520-2 could be based on a CSI-RS antenna port level granularity as is the case in FIG. 6. Based on the report 520, the eNodeB is aware of the signal strength of the CSI-RS antenna port groups and is therefore able to configure the UE to utilize the best subset of CSI-RS antenna ports (e.g., a maximum of eight antenna ports out of the combined antenna ports of the macro eNodeB cell and the other transmission points) in a UE specific manner for the further COMP or normal Rel. 10 TM9 operation.

Figure 8:
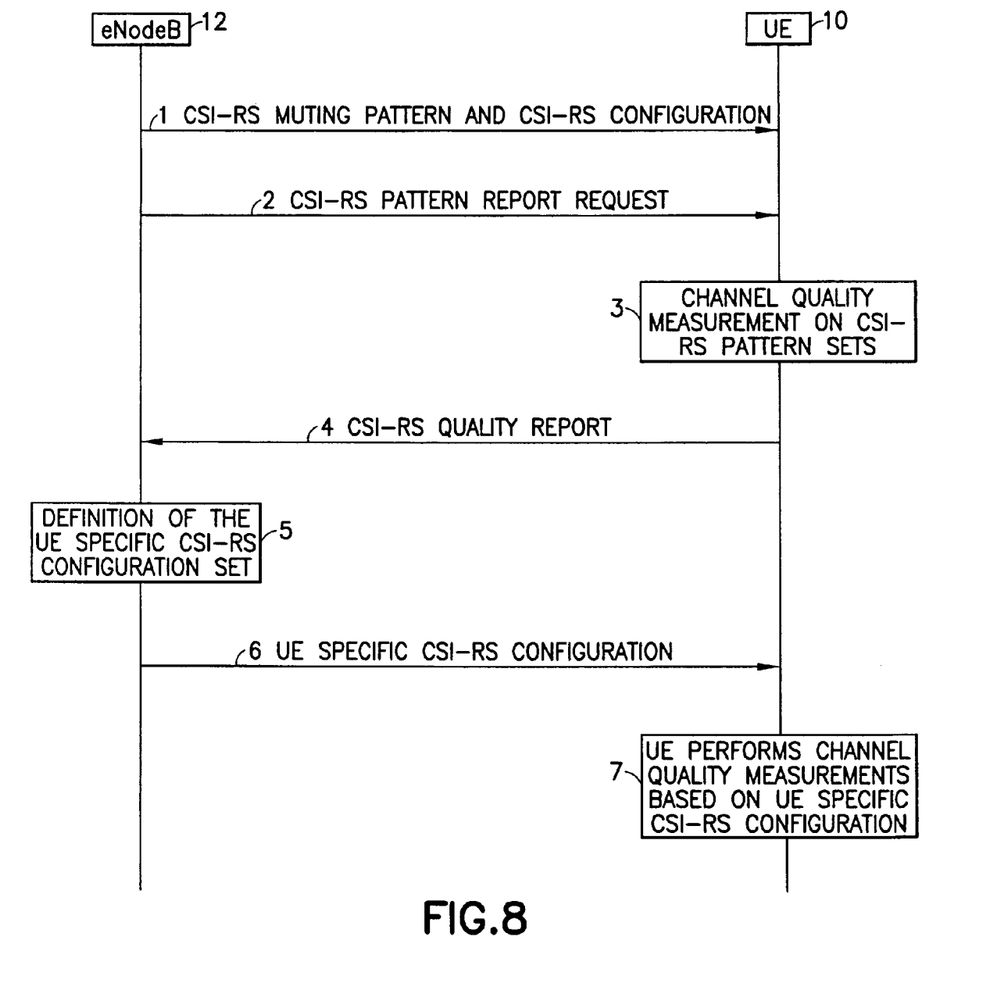
FIG. 8 is a signaling diagram illustrating an exemplary procedure for measuring, determining and signaling the CSI-RS antenna ports to be configured.

The COMP collaboration set definition can be considered to be of the following exemplary operations, as shown in FIG. 8:

1. The eNodeB signals the CSI-RS muting pattern 510 as well as the UE-specific CSI-RS configuration 515 to the UE.

2. The eNodeB requests a report from the UE about the channel quality of the different sets of CSI-RS patterns (corresponding to sets 720 indicated by the CSI-RS muting pattern 510) and the configured UE-specific CSI-RS antenna ports 515 (e.g., from the macro cell in case of initial COMP collaboration-set search).

3. The UE checks the channel quality of the individual CSI-RS pattern sets (each set comprising four CSI-RS patterns/ports as indicated by the CSI-RS muting pattern 510 and the configured UE-specific CSI-RS antenna ports 515 as shown in FIG. 7).

a. The definition of channel quality in this context may comprise for instance the following:

i. Average received CSI-RS power over the patterns/ports within the reporting granularity (e.g., one or four CSI-RS antenna ports) or alternatively, of the strongest/best pattern within the reporting granularity set.

ii. Average received SINR (signal to interference plus noise ratio) over the patterns/ports within the reporting granularity or alternatively, of the strongest/best pattern within the reporting granularity set.

iii. The projected data throughput assuming the respective antenna ports within the reporting granularity were used in PDSCH data transmission (i.e., similar to the CQI definition in LTE). Alternatively, only the strongest antenna port within the reporting granularity might be considered.

4. The UE reports the outcome of the measurement to the eNodeB. The reporting may be implemented using, e.g., layer 1 (L1) signaling similar to the CSI measurements, or via MAC (media access control) procedures as is the case with, e.g., RSRP/RSRQ measurements in LTE. Different reporting granularities and information might be considered for report 520):

a. A bitmap of the best CSI-RS pattern sets is reported back to the eNodeB (e.g., a subset of the CSI-RS patterns as indicated by the muting pattern and the UE-specific configured CSI-RS antenna ports). This information gives only the identity for the CSI-RS pattern within the reporting granularity—but not quality of individual CSI-RS pattern or pattern set.

b. Indication of the sets of CSI-RS patterns together with the relative channel quality compared to the strongest/best sets of CSI-RS patterns. For example, the UE may send an indication of the strongest/best sets of CSI-RS patterns with four bits (one out of 16 sets), and for each set of weaker CSI-RS patterns, the UE indicates a relative performance/quality compared to that of the strongest set. The UE may also indicate the performance/quality corresponding to the strongest set of CSI-RS patterns. This reporting requires higher signaling overhead, but provides better, more elaborate information to the eNodeB in the selection of the COMP collaboration set for each specific UE.

The eNodeB might provide certain measurement restrictions to the UE in order to guide the UE on how to construct the final report 520:

i. The selection can be based on the N strongest/best sets of CSI-RS patterns depending on the related reporting granularity. The value of N could be set by the eNodeB by higher layer signaling. Thus, a UE will report exactly the N strongest/best set of CSI-RS patterns.

ii. The eNodeB guides the UE to take into account a relative quality/performance measure compared to the best quality/performance CSI-RS patterns. The UE therefore only reports the sets of CSI-RS patterns (depending again on the reporting granularity) fulfilling this requirement (e.g., number of reported sets of CSI-RS patterns depending on that quality/performance difference).

iii. The eNodeB could also request the UE to either report according to report (a) above (e.g., just indicating the better of the available sets of CSI-RS patterns) or request a better reporting as described above.

5. The eNodeB receives the report 520 from the UE and determines a UE specific COMP collaboration set—meaning, the eNodeB decides which CSI-RS antenna ports the transmission point assigns to each specific UE to be monitored and CSI information to be provided by the UE for DL operation in TM9 (including single-cell COMP).

6. The eNodeB informs the UE about the updated CSI-RS antenna ports the UE should be accordingly monitoring and should base the operation of the UE on, and also the CSI information to be provided by the UE. Typically, the CSI-RS antenna ports would be limited to the specific ports the UE is able to receive.

7. The UE performs channel quality measurements based on the UE specific CSI-RS configuration according to normal CSI-RS based DL operation of e.g. LTE.

Note that the eNodeB could trigger the report request in (2) to (4) regularly, in order to keep the longer-term track of the best possible COMP collaboration set for single-cell ID COMP operations.

Figure 9:
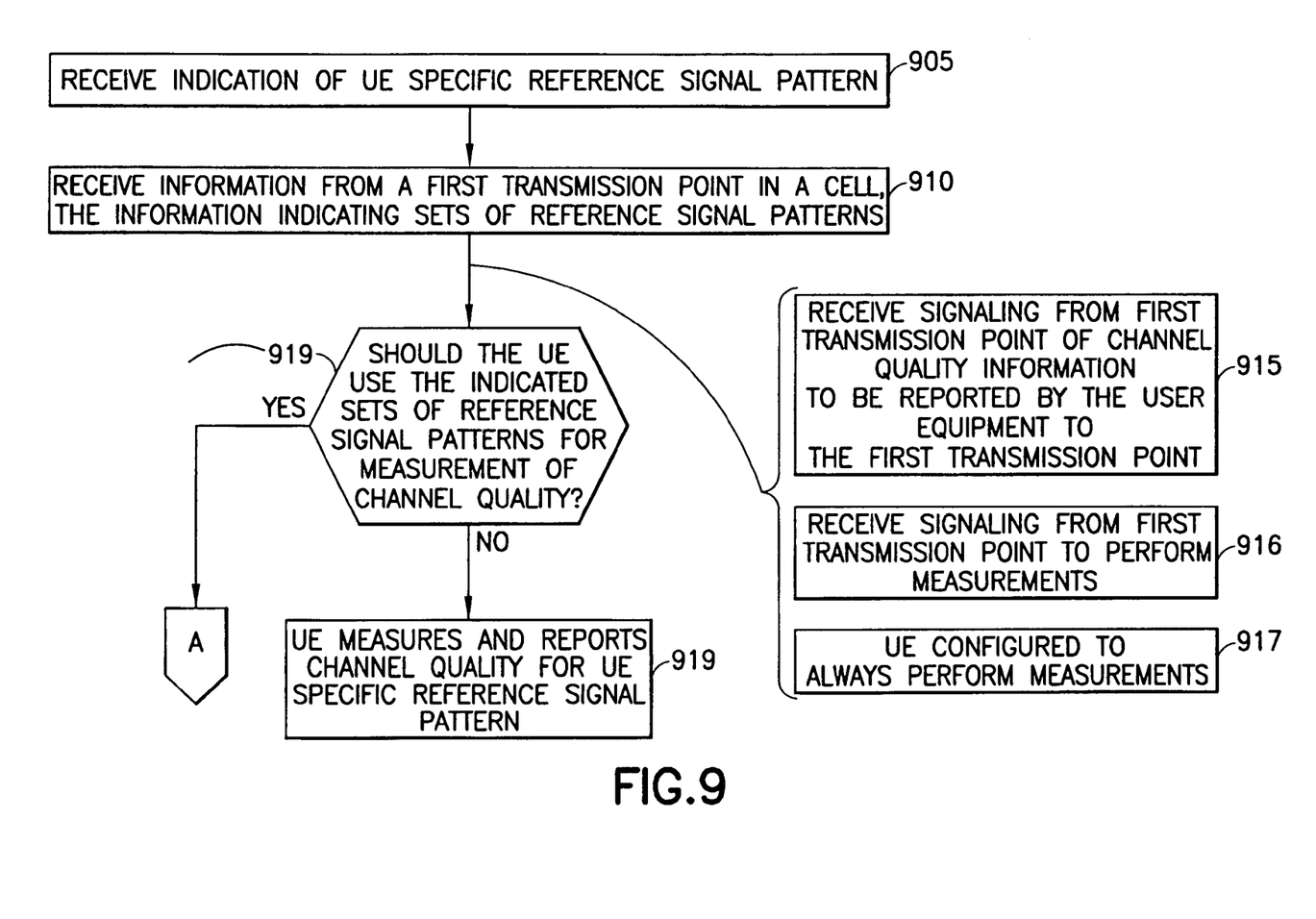
FIG. 9 is a block diagram of an exemplary method performed by a user equipment for reference signal port discovery involving transmission points.
Figure 10:
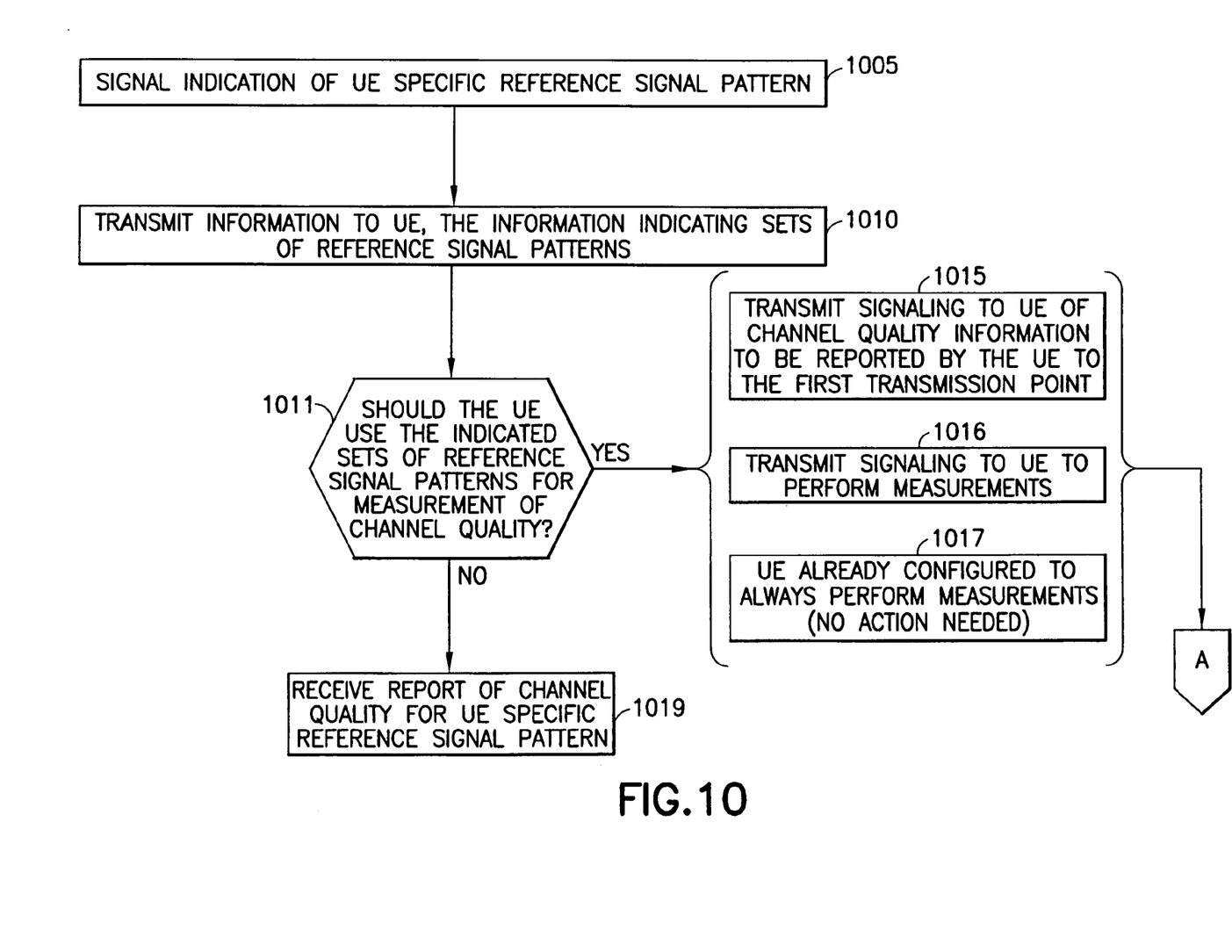
FIG. 10 is a block diagram of an exemplary method performed by a transmission point in a cell for reference signal port discovery involving other transmission points in the cell.

Turning to FIG. 9, a block diagram is shown of an exemplary method performed by a user equipment for reference signal port discovery involving multiple transmission points. In the examples of FIGS. 9 and 10, the first transmission point is the eNodeB 12. However, it might be possible for other transmission points in a cell to perform these operations. In block 905, the user equipment receives an indication of a UE specific reference signal pattern to be measured from a first transmission point in a cell. In block 910, the user equipment receives information from the first transmission point in the cell. The information indicates sets of reference signal patterns and which sets of reference signal patterns have zero transmission power (e.g., as indicated by the CSI-RS muting pattern) for certain frames of DL transmissions by the first transmission point. The full set of reference signal patterns may correspond to one of one or more other transmission points in the cell or a neighboring cell.

The user equipment may or may not use the CSI-RS muting pattern for channel quality measurements. If the user equipment should use the CSI-RS muting pattern for performing channel quality measurements, then the user equipment should be informed of such. There are multiple options for this to occur.

For example, in block 915, the user equipment optionally receives signaling from first transmission point of channel quality information to be reported by the user equipment to the first transmission point. That is, the first transmission point indicates which of the scenarios in step 4 above are to be used to report the channel quality. Another option is illustrated by block 916, where the user equipment receives signaling from the first transmission point to perform channel quality measurements using the information (e.g., the CSI-RS muting pattern). Yet another option is illustrated by block 917, where the user equipment is configured (e.g., with original or updated software) to always perform channel quality measurements using the information (e.g., the CSI-RS muting pattern).

Thus, in block 919, the user equipment determines if the user equipment should use the indicated sets of reference signal patterns for measurements of channel quality. If not (block 919=NO), the user equipment measures and reports (block 919) channel quality for the user equipment specific reference signal pattern received in block 905.

In block 920 (performed if block 919=YES), based on the received information, the user equipment measures the channel quality for the indicated sets of reference signal patterns (received in block 910) and for the UE specific reference signal pattern (received in block 905).

In block 930, the user equipment reports indications of the measured channel quality for the indicated sets of reference signal patterns and for the UE specific reference signal pattern to the first transmission point. It is noted that the UE specific reference signal pattern could be transmitted separately. These indications are in accordance with the signals received in block 915. In block 940, the user equipment receives signaling of indications of an updated user equipment specific group of CSI-RS patterns the user equipment should measure and of channel quality information to be sent to the first transmission point.

In FIG. 10, a block diagram is shown of an exemplary method performed by a first transmission point (such as eNodeB 12) in a cell for reference signal port discovery involving several transmission points within the cell. In block 1005, the first transmission point transmits an indication of a UE specific reference signal pattern to UE. In block 1010, the first transmission point transmits information to a user equipment in a cell. The information indicates sets of reference signal patterns that have zero transmission power (e.g., as indicated by the CSI-RS muting pattern) for certain frames of DL transmissions by the first transmission point. The full set of thereby indicated reference signal patterns may correspond to one of one or more other transmission points in the cell or neighboring cells.

In block 1011, the transmission point determines if the user equipment should use the indicated sets of reference signal patterns for measurement of channel quality. If not (block 1011=NO), in block 1019, the transmission point receives from the user equipment a report of channel quality for the user equipment specific reference signal pattern (corresponding to block 1005). If so (block 1011=YES), the transmission point selects one of the blocks 1015, 1016, or 1017.

The transmission point, in block 1015, determines channel quality information to be provided by the user equipment (see, e.g., step 4 above in reference to FIG. 8) and signals this information to the user equipment. In block 1016, the transmission point determines that the user equipment is already configured to always perform channel quality measurements using the transmitted information in block 1010, and the transmission point takes no action.

In block 1020, the transmission point receives from the user equipment indications of the measured channel quality for the indicated sets of reference signal patterns and typically also the UE specific reference signal pattern. The transmission point, in block 1030, determines an updated user equipment specific group of CSI-RS patterns for the UE. In block 1050, the transmission point signals indications of the determined updated user equipment specific group of sets of CSI-RS patterns.

Without in any way limiting the scope, interpretation, or application of the claims appearing below, a technical effect of one or more of the example embodiments disclosed herein is use of information, such as a pattern like the CSI-RS pattern, to indicate to a user equipment which sets of CSI-RS patterns should have its channel quality measured and having the user equipment inform a transmission point as to the results of the channel quality measurements.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. An apparatus comprising:
one or more processors; and
one or more memories including computer program code,
the one or more memories and the computer program code configured, with the one or more processors, to cause the apparatus to perform the following:
receiving information indicating one or more sets of reference signal patterns from a first transmission point, wherein the one or more sets of reference signal patterns comprise one or more muting reference signal patterns that have zero transmit power for certain frames of transmissions by the first transmission point, and at least one of the indicated one or more sets of reference signal patterns corresponds to one of one or more other transmission points;
measuring the channel quality for the indicated one or more sets of reference signal patterns using the one or more muting reference signal patterns; and
reporting indications of the measured channel quality for the indicated one or more sets of reference signal patterns to the first transmission point,
wherein the first transmission point is coupled via a data and control path to the one of one or more other transmission points.

2. The apparatus of claim 1, wherein the information comprises a pattern of bits, each of the bits indicating a set of reference signal patterns that should be measured for channel quality.

3. The apparatus of claim 2, wherein the pattern comprises a zero power channel state information-reference signal bitmap.

4. The apparatus of claim 1, wherein:
the at least one memory and the computer program code are further configured, with the at least one processor, to cause the apparatus to perform at least the following:
receiving an indication of a user equipment specific reference signal pattern that should be measured for channel quality;
measuring further comprises measuring the user equipment specific reference signal pattern for channel quality; and
reporting further comprises reporting both the measured channel quality for the indicated one or more sets of reference signal patterns and for the user equipment specific reference signal pattern.

5. The apparatus of claim 1, wherein reporting indications of the measured channel quality further comprises reporting for at least one of the indicated one or more sets of reference signal patterns whether a corresponding measured channel quality meets a predetermined threshold.

6. The apparatus of claim 1, wherein:
measuring further comprises measuring, for at least one of the indicated one or more sets of reference signal patterns, channel quality for a plurality of ports; and
reporting further comprises reporting for the at least one of the indicated one or more sets of reference signal patterns and a corresponding plurality of ports whether a corresponding measured channel quality meets a predetermined threshold.

7. The apparatus of claim 1, wherein the measuring is performed in response to a channel state information-reference signals report request message.

8. The apparatus of claim 1, wherein the reporting is performed using a channel state information-reference signals quality report message.

9. The apparatus of claim 1, wherein:
the first transmission point is in a cell;
the one or more other transmission points are a plurality of other transmission points;
at least one of the plurality of other transmission points is in the cell; and
at least an additional one of the plurality of other transmission points are in one or more neighbor cells.

10. The apparatus of claim 1, wherein measuring the channel quality is performed in response to signaling from the first transmission point indicating the indicated one or more sets of reference signal patterns are to be measured for signal quality.

11. The apparatus of claim 1 comprising a user equipment and wherein measuring the channel quality is performed in response to internal configuration of the user equipment indicating the indicated one or more sets of reference signal patterns are to be measured for signal quality.

12. A computer program product comprising a non-transitory computer-readable memory bearing computer program code embodied therein for use with a computer, the computer program code comprising:
code for receiving information indicating one or more sets of reference signal patterns from a first transmission point, wherein the one or more sets of reference signal patterns comprise one or more muting reference signal patterns that have zero transmit power for certain frames of transmissions by the first transmission point, and at least one of the indicated one or more sets of reference signal patterns corresponds to one of one or more other transmission points;
code for measuring the channel quality for the indicated one or more sets of reference signal patterns using the one or more muting reference signal patterns; and
code for reporting indications of the measured channel quality for the indicated one or more sets of reference signal patterns to the first transmission point,
wherein the first transmission point is coupled via a data and control path to the one of one or more other transmission points.

13. The computer program product of claim 12, wherein the information comprises a pattern of bits, each of the bits indicating a set of reference signal patterns that should be measured for channel quality.

14. An apparatus comprising:
one or more processors; and
one or more memories including computer program code, the one or more memories and the computer program code configured, with the one or more processors, to cause the apparatus to perform the following:
transmitting information indicating one or more sets of reference signal patterns from a first transmission point to a user equipment, wherein the one or more sets of reference signal patterns comprise one or more muting reference signal patterns that have zero transmit power for certain frames of transmissions by the first transmission point, and at least one of the indicated one or more sets of reference signal patterns corresponds to one of one or more other transmission points; and
receiving from the user equipment indications of channel quality for the indicated one or more sets of reference signal patterns that are measured using the one or more muting reference signal patterns, wherein the first transmission point is coupled via a data and control path to the one of one or more other transmission points.

15. The apparatus of claim 14, wherein the at least one memory and the computer program code are further configured, with the at least one processor, to cause the apparatus to perform at least the following:
determining a user equipment specific set of reference signal patterns the user equipment should measure; and
signaling an indication to the user equipment of the determined user equipment specific set of reference signal patterns the user equipment should measure.

16. The apparatus of claim 14, wherein the at least one memory and the computer program code are further configured, with the at least one processor, to cause the apparatus to perform at least the following:
determining channel quality information to be provided by the user equipment to the first transmission point for the measured channel quality; and
signaling indications of the determined channel quality information to the user equipment.

17. The apparatus of claim 14, wherein the at least one memory and the computer program code are further configured, with the at least one processor, to cause the apparatus to perform at least the following: sending a channel state information-reference signals report request message to the user equipment to request the user equipment to measure the channel quality.

18. The apparatus of claim 14, wherein the receiving comprises receiving a channel state information-reference signals quality report message.

19. The apparatus of claim 14, wherein:
the first transmission point is in a cell;
the one or more other transmission points are a plurality of other transmission points;
at least one of the plurality of other transmission points is in the cell; and
at least an additional one of the plurality of other transmission points are in one or more neighbor cells.

20. The apparatus of claim 14, wherein the at least one memory and the computer program code are further configured, with the at least one processor, to cause the apparatus to perform at least the following: prior to receiving, signaling the user equipment an indication the one or more sets of reference signal patterns are to be measured for signal quality.

* * * * *